United States Patent [19]

Kreckel

[11] Patent Number: 5,747,131
[45] Date of Patent: May 5, 1998

[54] PROCESS FOR BUNDLING AND/OR FIXING ARTICLES BY USE OF AN EXTENSIBLE PLASTIC TAPE

[75] Inventor: Karl W. Kreckel, Benzenbergweg, Germany

[73] Assignee: Minnesota Mining and Manufacturing Company, St. Paul, Minn.

[21] Appl. No.: 481,249

[22] PCT Filed: Dec. 27, 1993

[86] PCT No.: PCT/US93/12581

§ 371 Date: Jun. 12, 1995

§ 102(e) Date: Jun. 12, 1995

[87] PCT Pub. No.: WO94/16950

PCT Pub. Date: Aug. 4, 1994

[30] Foreign Application Priority Data

Jan. 19, 1993 [DE] Germany ............... 43 01 165.9

[51] Int. Cl.⁶ .................................................. C09J 7/02
[52] U.S. Cl. .................. 428/40.1; 53/399; 53/580; 156/162; 156/185; 156/212; 156/213; 156/229; 428/41.31; 428/41.5; 428/41.8; 428/42.2; 428/43; 428/194; 428/906
[58] Field of Search ............... 478/40.1, 41.3, 478/41.5, 41.7, 41.8, 42.1, 42.2, 43, 194, 352, 354, 906, 355; 156/229, 162, 185, 212, 213; 53/399, 580; 206/386, 813

[56] References Cited

U.S. PATENT DOCUMENTS

| | | | |
|---|---|---|---|
| 3,015,916 | 1/1962 | Denton | 100/2 |
| 4,522,853 | 6/1985 | Szonn | 428/40.1 |
| 4,770,913 | 9/1988 | Yamamoto | 428/41.9 |
| 5,314,557 | 5/1994 | Schwartz | 156/229 |
| 5,496,599 | 3/1996 | Schwartz | 428/35.7 |

*Primary Examiner*—Nasser Ahmad
*Attorney, Agent, or Firm*—William L. Huebsch

[57] ABSTRACT

A process for bundling and/or fixing of articles using an extensible plastic tape having a Young modulus of at least approximately 170 bars but less than 7,000 bars and an extensibility in longitudinal direction of at least approximately 150%, with a recovery of less than 50 percent after extension, at least portions of the length of the plastic tape being free of pressure sensitive adhesive. In the process a) the plastic tape is permanently stretched, the permanently stretched tape is arranged around the articles to be bundled and/or fixated, and the ends of the tape are bound together; or b) the plastic tape is permanently stretched, one of its ends is then fixed, and thereafter the permanently stretched plastic tape is arranged around the articles to be bundled and/or fixated, and the other of its ends is fixed; and/or c) one of the ends of the plastic tape is fixed, the plastic tape is permanently stretched and arranged around the articles to be bundled and/or fixated, and the other of its ends is fixed.

32 Claims, 4 Drawing Sheets

PROCESS FOR BUNDLING AND/OR FIXING ARTICLES BY USE OF AN EXTENSIBLE PLASTIC TAPE

FIELD OF THE INVENTION

This invention is directed to a process for bundling and/or fixing of articles by use of an extensible plastic tape and to an extensible plastic tape having self-adhesive properties which may be used with particular advantage in the process according to the invention.

BACKGROUND OF THE INVENTION

U.S. patent application Ser. No. 07/731,341 suggests a means for securing articles during transport, storage and other occasions, wherein an extensible plastic tape is used which is completely coated with a pressure sensitive adhesive on one side, and is stretched in longitudinal direction thereby reducing its adhesive force.

U.S. patent application Ser. No. 07/802,061 suggests a self-adhesive plastic tape which, while capable of being attached to articles, at the same time will not cause damage to the article when removed. This is accomplished by using a self-adhesive plastic tape which reduces its adhesive force due to stretching in longitudinal direction and thus, is readily removed from the respective article. Such plastic tape has a Young modulus of at least 2,500 psi but less than 72,500 psi. Furthermore, the sheet supporting the adhesive has high tensile strength, an elongation at break of at least 150% when measured in longitudinal direction, and low recovery.

SUMMARY OF THE INVENTION

The basic problem addressed by the present invention is to provide a process for improved fixing and/or bundling of articles and to create a means by use of which articles can be bundled and/or fixed.

The technical problem is solved by the process having the features of claim 1. The following subclaims relate to preferred embodiments of the process according to the invention.

According to the invention, the means for bundling and/or fixing of articles is an extensible plastic tape having the features of claim 18. The following subclaims relate to preferred embodiments of the adhesive tape according to the invention.

According to the process of the invention, bundling and/or fixing of articles in the simplest case is effected using an extensible plastic take having a Young modulus of approximately 170 bars but less than 7,000 bars and an extensibility in longitudinal direction of at least 150%, with low recovery.

According to the invention, in one embodiment at least one plastic tape is stretched, and the stretched tape is arranged around the articles to be bundled and/or fixated. Thereafter, the loose ends of the stretched tape are bound together. In another embodiment, the stretched plastic tape preferably is fixed at one end and arranged around the articles to be bundled and/or fixated, whereafter the loose end is fixed. The first fixing position of the stretched plastic tape may be located at either the articles to be bundled and/or fixated themselves, or at a support whereon the articles are situated, or at any other position suitable in some other way. Fixation of the loose end after bundling and/or fixing the articles then may be effected using the plastic tape itself, or at an article of the articles to be bundled and/or fixated, or their package material, support (pallet), or another suitable position. In yet another embodiment of the process according to the invention, the plastic tape may be fixed first, then stretched and arranged around the articles to be bundled and/or fixated, whereafter the loose end is fixed. Fixation of the plastic tape in this embodiment may be effected in the same way as described above for the others.

Preferably, stretching of the plastic tape is effected by applying force acting in longitudinal direction of the tape while arranging the plastic tape around the articles to be bundled and/or fixated.

In the process of the invention, binding the loose ends together is preferably effected by knotting, cementing, clamping, clipping, sealing or combinations of these measures.

In cases where fixation of at least one of the two loose ends of the stretched extensible plastic tape is effected first, the aforesaid is done particularly by knotting, cementing, clamping, clipping, sealing or combinations of these measures. And this measure represents the first step when the plastic tape is fixed first, and then is stretched only when being arranged around articles for bundling and/or fixation. Then, preferably, the respective ends left loose are likewise fixed by knotting, cementing, clamping, clipping, sealing or combinations of these measures.

Preferably, the plastic tape is wound around the articles to be bundled and/or fixated in stretched form. However, other configurations of arranging are possible, particularly those as described in U.S. patent application Ser. No. 07/731,341.

In fixing at least one loose end of the plastic tape, it is advantageous not to stretch the terminal region of the tape. This prevents a knot from coming loose. That end being widened in relation to the stretched tape due to non-stretching cannot be pulled through the knot which otherwise might result in the knot coming loose.

In another embodiment of the process according to the invention, at least one article of the articles to be bundled and/or fixated is provided with an adhesive spot, and one end of the extensible plastic tape, starting from the adhesive spot, is led around the articles to be bundled and/or fixated, particularly with the use of force in longitudinal direction of the extensible plastic tape.

Then, the other end of the extensible plastic tape is cemented at an adhesive spot which either may be identical with the first adhesive spot or also may be located at another position, with the material to be bundled and/or fixated being wound at least once by the extensible plastic tape.

If the articles to be bundled and/or fixated are on a support such as a pallet, the adhesive spot also may be arranged on this support. Here, the extensible tape, starting from the adhesive spot arranged on the support, is led around the articles to be bundled and/or fixated, either to be cemented at the same adhesive spot or another adhesive spot, or to be bound with the stretched plastic tape itself after at least one wind around the articles to be bundled and/or fixated. Binding then may be effected as described above.

If the articles or goods to be bundled and/or fixated have a corresponding package, the adhesive spot also may be arranged directly on the wrapping of the goods or articles with any type of adhesives being usable. Thus, in addition, hot melt adhesives, fast-setting adhesives such as close contact glue, adhesive tapes such as single or double-side adhesive tapes as well as transfer tapes (dry transferable adhesive films) are also possible. Preferably, quite aggressive adhesives also may be used which, particularly with demanding mechanical stress, ensure reliable bundling and/ or fixing of the articles by means of the adhesive tape adhering on the adhesive spot.

In another preferred embodiment of the process according to the invention, the adhesive spot may be formed on the articles to be fixated and/or bundled by a transfer tape or a double-side adhesive tape. For this purpose, a double-side adhesive tape or transfer tape is applied onto the material to be bundled and/or fixated. Here, the extensible plastic tape is bound to the transfer tape or double-side adhesive tape applied onto the articles, stretched, led around the articles to be bundled and/or fixated, and cemented at another, suitable position. Likewise, this may be effected on the free side of the transfer tape or double-side adhesive tape having been applied onto the articles to be bundled and/or fixated if there is sufficient space on this transfer tape or double-side adhesive tape.

Another preferred embodiment of the process according to the invention is to either arrange the extensible plastic tape on the articles to be bundled and/or fixated, thereafter to attach it to at least one of said articles using a single side adhesive tape, or to attach a double-side adhesive tape or transfer tape to at least one of said articles as the fixation site. Then, the extensible plastic tape is bound to this fixation site, led around the articles to be bundled and/or fixated, starting from the fixation site, and subsequently, the loose end of the extensible plastic tape is also fixed.

This type of fixing is advantageous because fixation of articles thereby is effected in a particularly reliable fashion. The stretched plastic tape having non-stretched and portions is hindered of detaching from the articles to be bundled end or fixated without pulling the stretched band at an angle as described in U.S. patent application Ser. No. 07/802,061.

Preferably, stretching of the extensible plastic tape is effected by applying force in longitudinal direction of the plastic tape, for example, in bundling and/or fixing articles having an edge by winding the plastic tape over one of the edges and stretching by applying force. In particular, this procedure is described in U.S. patent application Ser. No. 07/731,341

In a particularly preferred embodiment of the process according to the invention, the extensible plastic tape is wound from a roll. The extensible plastic tape is provided with areas of pressure sensitive adhesive which serve to attach the extensible plastic tape having self-adhesive properties onto one of the articles to be bundled and/or fixated, for example. Then, in the above-described fashion, the plastic tape wound from the roll is stretched, the articles are bundled and/or fixated, and the extensible plastic tape is cut at a second site having an area provided with pressure sensitive adhesive such that the separation approximately runs through the middle of the area with pressure sensitive adhesive. Then, using the pressure sensitive adhesive, the loose end of cut-off tape is attached to the articles to be bundled and/or fixated. This may be effected using the measures described above. Similarly, the extensible plastic tape having areas of pressure sensitive adhesive and being on the roll has in turn an area of pressure sensitive adhesive at its beginning. Thus, the plastic tape is available for another application. Cutting the plastic tape in the areas with pressure sensitive adhesive may be facilitated by, for instance, providing the support layer of the extensible plastic tape with a perforation.

In a modified embodiment of the process according to the invention, the extensible plastic tape wound from the roll is provided with pressure sensitive adhesive only prior to use, e.g., by affixing a transfer tape or a double-side adhesive tape. This allows for flexible selection of length of the required plastic tape. In this embodiment, subsequent to selecting the length of the plastic tape and prior to cutting same, an area of pressure sensitive adhesive is arranged around the later separation site, so that after cutting the extensible plastic tape, areas with pressure sensitive adhesive are present at each end.

The process according to the invention, particularly when using the plastic tape of the invention, permits binding together most various articles. Thus, for example, everyday requirement articles offered in supermarkets in loose form such as bottles, cans, cardboard boxes with the corresponding bulk goods may be bound together and carried away in a very simple fashion. This can be done both by the customer and by the dealer who, already in his offer, bundles a certain number of these articles and offers them as an ensemble such as, for instance, several beverage cans, bottles etc. combined together. Likewise, the process according to the invention for fixing and/or bundling of articles is suitable for transporting articles which may be combined to ensembles. Thus, instead of using steel ribbons, for example, loose goods may be fixed onto pallets, in which fixing particularly the plastic tape according to the invention is attached adherently to the bottom side of the pallet first, then the plastic tape according to the invention is stretched, preferably over an edge and over the pile of goods to be transported, to be fixed at the opposite side, again under the pallet, or to be led through under same to be bound with the stretched tape at a suitable position.

DESCRIPTION OF THE PREFERRED EMBODIMENT(S)

Figure 1:
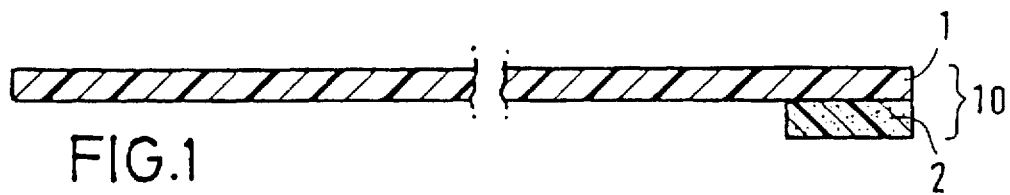
FIG. 1 shows the plastic tape according to the invention having a support layer (1) and arranged thereon at least one area with pressure sensitive adhesive (2), said area not being present over the full length of the plastic tape.
Figure 2:
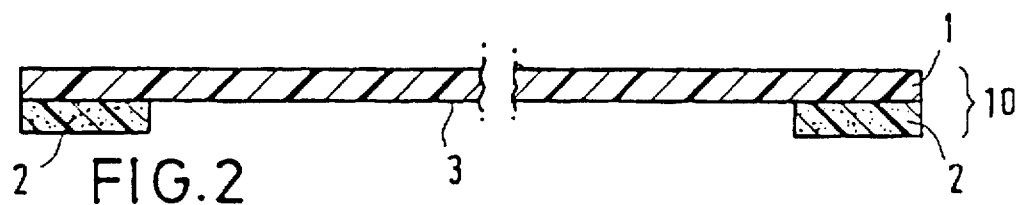
FIG. 2 shows the plastic tape according to the invention having two areas with pressure sensitive adhesive.
Figure 3:
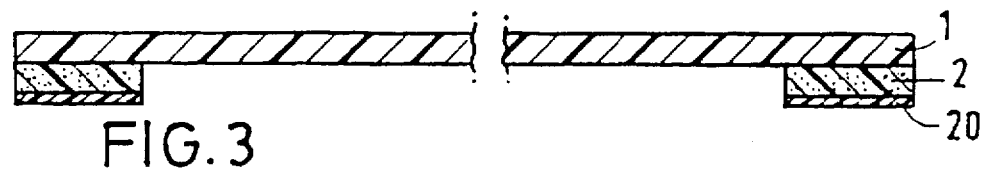
FIG. 3 shows the plastic tape according to FIG. 2, the areas with pressure sensitive adhesive being covered by a protecting sheet (20).

Preferably, the extensible plastic tape, as shown schematically in FIG. 2, has two areas with pressure sensitive adhesive 2, with the areas 2 having pressure sensitive adhesive separated from areas without pressure sensitive adhesive 3. In a particularly preferred embodiment, the extensible plastic tape 10 has areas with pressure sensitive adhesive 2 at each end. Preferably, the area without pressure sensitive adhesive 3, i.e., that of the support layer 1 itself, is substantially larger than the areas 2 of the extensible plastic tape 10 having pressure sensitive adhesive. Here, the areas with pressure sensitive adhesive 2 may be applied directly onto the extensible support layer 1. However, it is also possible to form the areas with pressure sensitive adhesive 2 by at least one adhesive tape coated with pressure sensitive adhesive. The double-side adhesive tape itself consists of a support sheet onto which pressure sensitive adhesive has been applied on both sides. In contrast, the transfer tape consists of only one layer of pressure sensitive adhesive.

If the pressure sensitive adhesive is directly coated onto the extensible support layer 1, it is advantageous to previously subject the corresponding areas to a chemical or physical treatment to obtain improved adhesion between extensible support layer and pressure sensitive adhesive. As a chemical priming process, treatment of extensible support layer 1 with adhesion promoters is preferred. As a physical method to improve adhesion between extensible support layer 1 and the pressure sensitive adhesive, corona discharge treatment, in particular, is possible.

Preferably, the extensible plastic tape 10 consists of an extensible support layer 1 having a Young modulus of approximately 170 bars but less than 7,000 bars and an extensibility in longitudinal direction of at least 150%, with low recovery. Preferably, the extensible support layer 1 has high tensile strength and an elongation at break in longitudinal direction of between 50 to 1,200%, preferably between 150 to 700%, particularly preferred of between 350 to 700%, and is substantially inelastic having an elasticity of less than 50% recovery after extension, preferably less than 30% elastic recovery, and particularly preferred less than 20% elastic recovery. Preferably, the Young modulus is 200 bars to 3,500 bars, more preferably 340 bars to 2,000 bars. The magnitude of the Young modulus is substantially determined by workability; if the Young modulus is too high, it will be increasingly difficult to extend the plastic tape 10, but if it is too low, the plastic tape 10 loses its properties and becomes rubbery.

As examples for the material suitable as the support layer, the following materials will be given: polyolefins such as polyethylene including HDPE (high density polyethylene), polyethylene of low density, linear polyethylene of low density and linear polyethylene of ultra-low density, polypropylene and polybutylene, vinyl copolymers such as plasticized and non-plasticized poly(vinyl chloride) and poly (vinyl acetate); olefinic copolymers such as ethylene/ methacrylate copolymers, ethylene/vinyl acetate copolymer, acrylonitrile-butadiene-styrene copolymers and ethylene/ propylene copolymers; acrylic polymers and copolymers and combinations of these materials. Mixtures or blends of any plastic or plastic and elastomeric material such as polypropylene/polyethylene, polyurethane/polyolefin, polyurethane/polycarbonate, polyurethane/polyester may also be used. The support layer may be present in the form of single or multilayered sheets, non-woven films, porous films, foam-like films and combinations thereof.

The support material also may be prepared from materials containing fillers such as, e.g., sheets provided with filler such as polyolefins having calcium carbonate.

Preferably, the extensible support layer of the plastic tape consists of polyethylene and polypropylene sheets which, particularly preferred, have materials which are linear polyethylene sheets having low and ultra-low density.

As the extensible support layer of the plastic tape, in particular, a polyethylene sheet of low density, the so-called LLDPE (linear low density polyethylene) having a density of from 0.80 to 0.92 g/cm 3 especially having a density of from 0.90 to 0.93 g/cm 3 may be used. The polyethylene sheets preferably contain structural units consisting of units copolymerizable with ethylene, particularly lower monoalkenes having a length of 3 to 8 carbon atoms such as, for instance, octene. In particular, these lower alkenes are present in amounts of from 0.5 to 10% by weight.

Processes for preparing the extensible support layer of the plastic tape according to the invention are described in U.S. patent application Ser. No. 07/802,061. The thickness of the support layer varies with the field of application. If the support tape is to be extended manually, low thickness is preferred as compared to extension which is possible using the respective efficient machines. In the latter case, the extensible support layer may have a thickness of up to 1 mm or more. By physical action such as raise of temperature, extension with correspondingly thick support layers might be correspondingly facilitated. For manual application fields, for purposes of everyday requirements, a thickness of the support layer 1 of from 10 to 250 μm is preferable.

If a pressure sensitive adhesive is used as the adhesive, it is preferred that it has the following adhesive properties: 0.5 N/dm to 800 N/dm, preferably 25 N/dm to 400 N/dm at a peeling angle of 180°, measured according to guidelines PSTC-1 and PSTC-3 and ASTM D 903-83 at a peeling rate of 12.7 cm/min. Adhesives which may be used can be selected from tackified rubber-based adhesives like natural gums, olefins, silicones, polyisoprenes, polybutadiene, polyurethane, styrene-isoprene-styrene and styrene-butadienestyrene block copolymers and other elastomers showing low recovery, as well as tackified or non-tackified acrylic adhesives such as copolymers of isooctyl acrylate and acrylic acid, which may be polymerized by radiation, solution suspension or emulsion processes.

Cross-linked adhesives are preferably used, particularly such pressure sensitive adhesives that are cross-linked to give high peel strength.

The thickness of the adhesive layer may vary in the range of from 5 μm to 1,000 μm. Preferably, a layer thickness of from 20 μm to 250 μm is used. Depending on the application field of the plastic tape according to the invention, these values may greatly exceed the upper limit. In the field of industrial packaging for bundling and/or fixing of correspondingly heavy goods, stronger adherent adhesives may also be used.

The extension of area 2 onto which the adhesive is coated onto the extensible support layer 1 substantially varies with the field of application.

Preferably, the adhesive areas 2 of the extensible self-adhesive plastic tape 10 according to the invention are covered with a protective sheet 20 if removal is one by one. Preferably, this protective sheet 20 has good stripping properties with respect to the pressure sensitive adhesive.

In another preferred embodiment, the side of support layer 1 in opposition to the side to which the adherent areas 2 are arranged is already preformed as a layer having pressure sensitive adhesive-repellent properties. Thereby, it is possible to stack a multiplicity of extensible plastic tapes 10, particularly in such way that each adherent area is arranged over another, with each back of the plastic tape 10 lying underneath serving the one lying above as a "protective sheet", whereas the bottom side serves as the support layer 1 for the pressure sensitive adhesive. This situation is shown schematically in FIG. 4 (left area of FIG. 4) and FIG. 7.

The intended use of the extensible plastic tape 10 having the pressure sensitive adhesive 2 arranged at the ends determines its length in the unextended state. The extensible adhesive tape 10 according to the invention may be arranged in stacks as described above (FIG. 4 and FIG. 7). These multilayered stripe-shaped stacks also may be arranged besides one another resulting in a block-like object made of several multilayered stacks.

Figure 7:
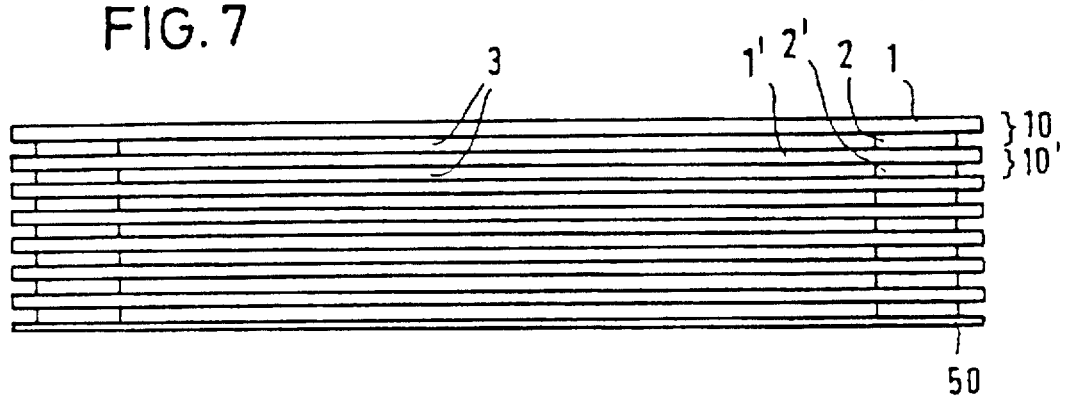
FIG. 7 shows a multilayer arrangement of the extensible plastic tape according to FIG. 6.

The stacks of the extensible plastic tapes 10 of the invention are completed by an end sheet 50 towards the stack basis (FIG. 7). The end sheet 50 may consist of a similar material as the protective sheet 25. Preferably, the end sheet 50 is reinforced to protect the stack of plastic tapes according to the invention against destructive mechanical action.

Figure 5:
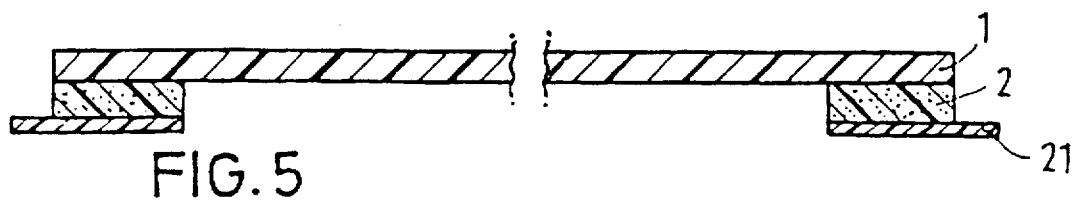
FIG. 5 shows an extensible plastic tape according to the invention corresponding to that of FIG. 3 with respect to arrangement, the protective layer (2) projecting beyond each free end of the plastic tape.

To facilitate workability of the plastic tape of the invention, at least one end of the stripe-shaped extensible adhesive plastic tape according to the invention may have an area with pressure sensitive adhesive, which area is at least partly masked by a cover tape 21, with the cover tape 21 projecting beyond the edge of the stack formed by the plastic tapes lying over one another in stripe shape. Thereby, the grasp for each one of the plastic tapes is facilitated. This situation is shown schematically in FIG. 5.

Figure 6:
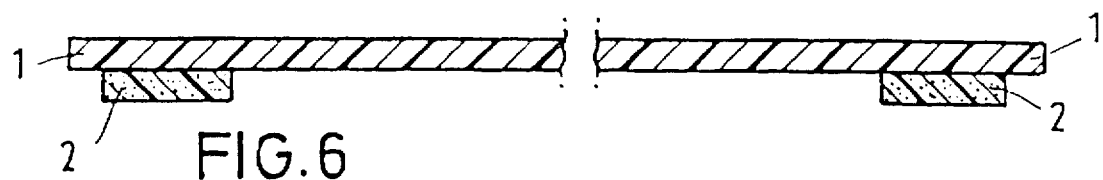
FIG. 6 shows a plastic tape according to FIG. 2, with the extensible support layer projecting beyond the area with pressure sensitive adhesive (2) at the end sides. Preferably, this may be the case at both ends of the plastic tape.

In a preferred embodiment, the pressure sensitive adhesive situated at the end side of the extensible support layer may be arranged such that the adhesive does not end flush with the end of the extensible support layer but is situated somewhat apart, whereby similarly, the stripe-shaped extensible adhesive tape can be grasped and removed from the stack more easily, as is illustrated in FIG. 6.

Figure 4:
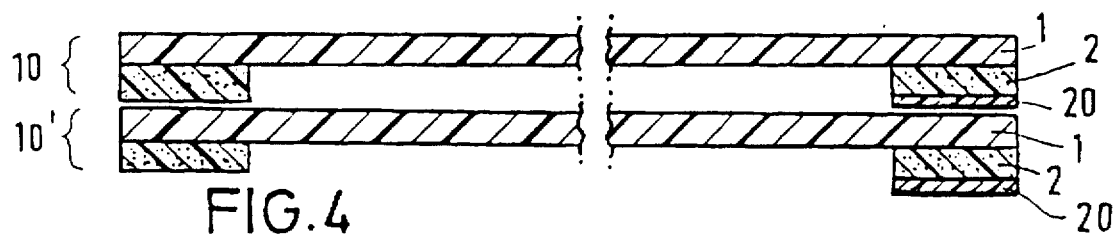
FIG. 4 shows an extensible plastic tape arranged in several layers and having two terminally arranged areas with pressure sensitive adhesive, with each terminally arranged area with pressure sensitive adhesive (2) being covered by a protecting sheet (20) to facilitated removal of the underlying plastic tape.

The plastic tape 10 of the invention may also be arranged in multilayered, stripe-shaped stacks where several multilayered stacks also may be arranged besides one another, and where the areas with pressure sensitive adhesive 2 not covered with a protective sheet 20 or a cover tape 21 are arranged on the side of another extensible plastic tape 10' of same or different type of design which side is opposite to the corresponding side of the other extensible plastic tape 10' having areas with pressure sensitive adhesive, as is illustrated in FIG. 4.

The extensible adhesive tape 10 has particularly preferred use in the process of the invention, especially if both ends of the extensible plastic tape have areas provided with pressure sensitive adhesive which may be considered as adhesive spots when operating the process according to the invention.

Figure 8:
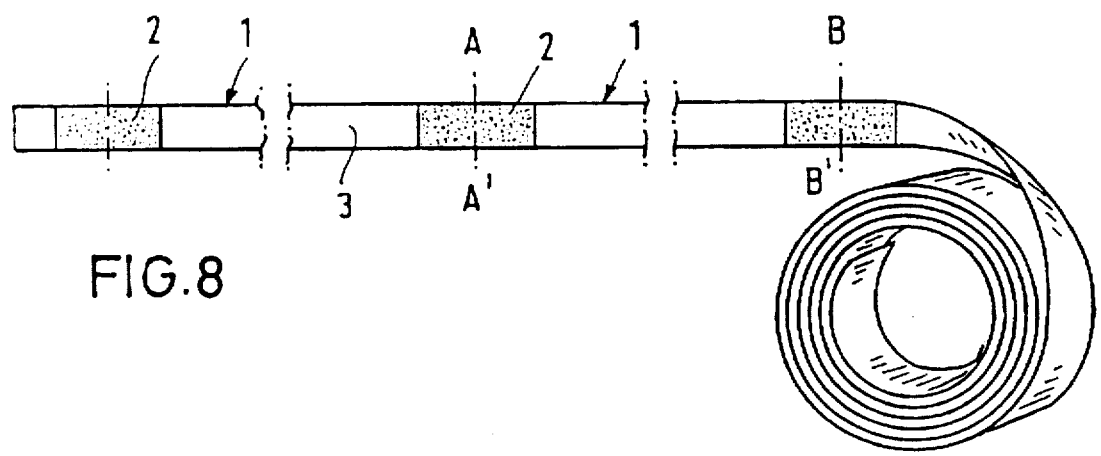
FIG. 8 shows an extensible plastic tape unwound from a roll which tape in the unwound area has a multiplicity of areas provided with pressure sensitive adhesive separated from the areas without pressure sensitive adhesive (3). There is shown a top view of the areas unwound from the roll. Preferably, the extensible plastic tape is cut in the area with pressure sensitive adhesive along the line AA' or BB' and so forth, and is used for bundling and/or fixing of articles.

The plastic tape 10 according to the invention also may be arranged in the form of rolls, as demonstrated schematically in FIG. 8. Each one of the adherent areas 2, preferably provided with pressure sensitive adhesive, is formed larger than required for use in the process according to the invention. The adherent area 2 is also arranged on the extensible support layer 1, as shown in FIG. 8. When the plastic tape of the invention is to be used, the required piece is unwound from the roll and is separated within the area of the pressure sensitive adhesive, for instance, along the line AA'. The plastic tape thus obtained may be employed as described in the process of the invention. Now, the other half of the separated plastic tape still being wound on the roll for the most part again has an area with pressure sensitive adhesive 2 at the beginning which may form the start for another application. Separation of the plastic tape as illustrated in FIG. 8 may be facilitated by providing the support layer 1 with a perforation within the area of pressure sensitive adhesive 2.

Figure 9:
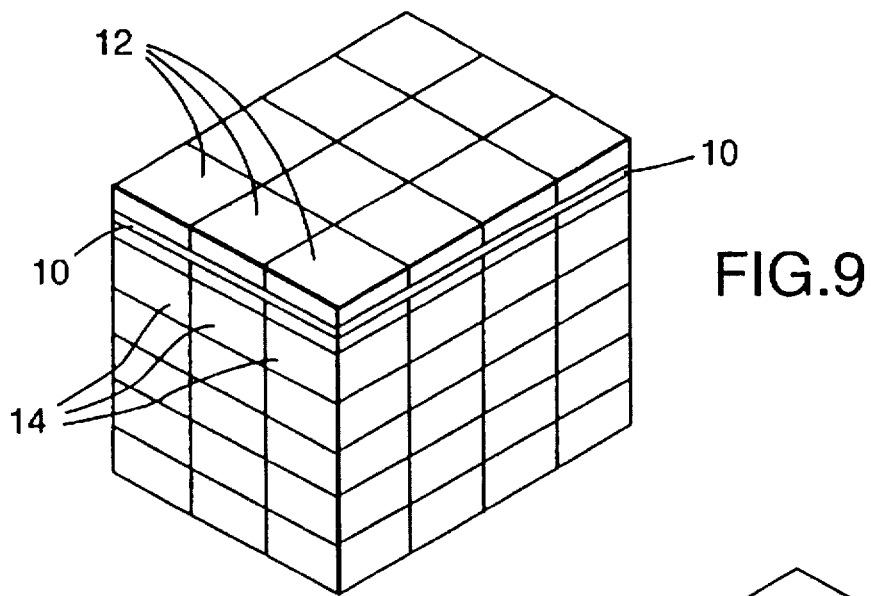
FIGS. 9 through 11 show articles bundled and/or fixated according to the process of the invention.

FIG. 9 shows a very simple embodiment of the process according to the invention, wherein the extensible plastic tape 10 of the invention is wound around a number of articles such as the boxes 12 placed upon one or more lines of articles as for instance, the boxes 14. This simple embodiment of the process according to the invention might, e.g., find use for simple tasks such as, for example, transport of a pallet for a short distance with low speed, such as in stores.

Figure 10:
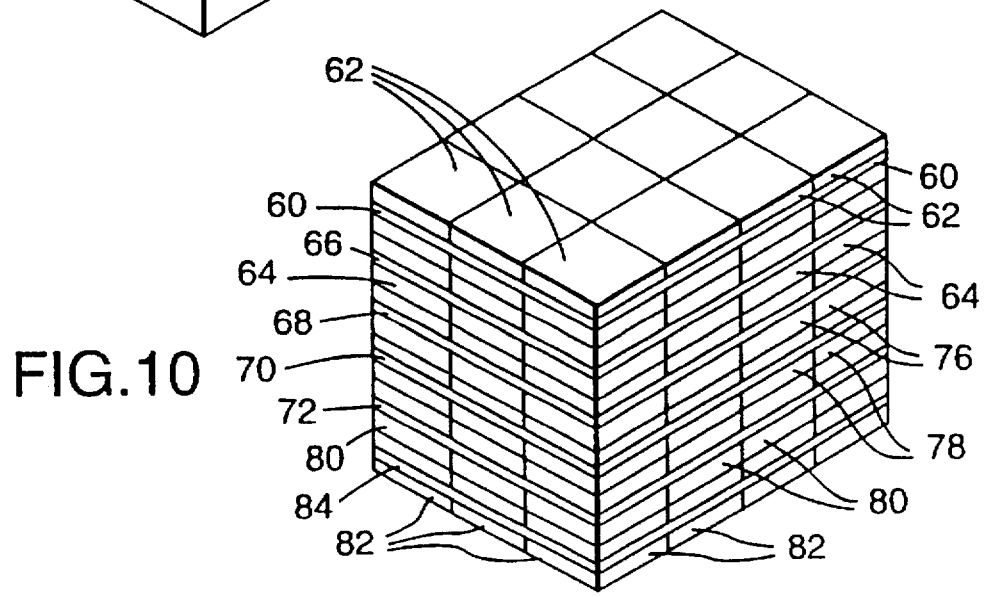

Developing this embodiment as shown in FIG. 10, an extensible plastic tape 60 is wound around a number of articles such as boxes 62 placed on one or more articles such as boxes 64, and similarly, a second line of articles such as boxes 64 may be wound with a second strip of extensible plastic tape 66. Additional strips of extensible plastic tape 68, 70, 72, 74 may serve to wind round additional lines of articles such as boxes 76, 78, 80,82.

Figure 11A:
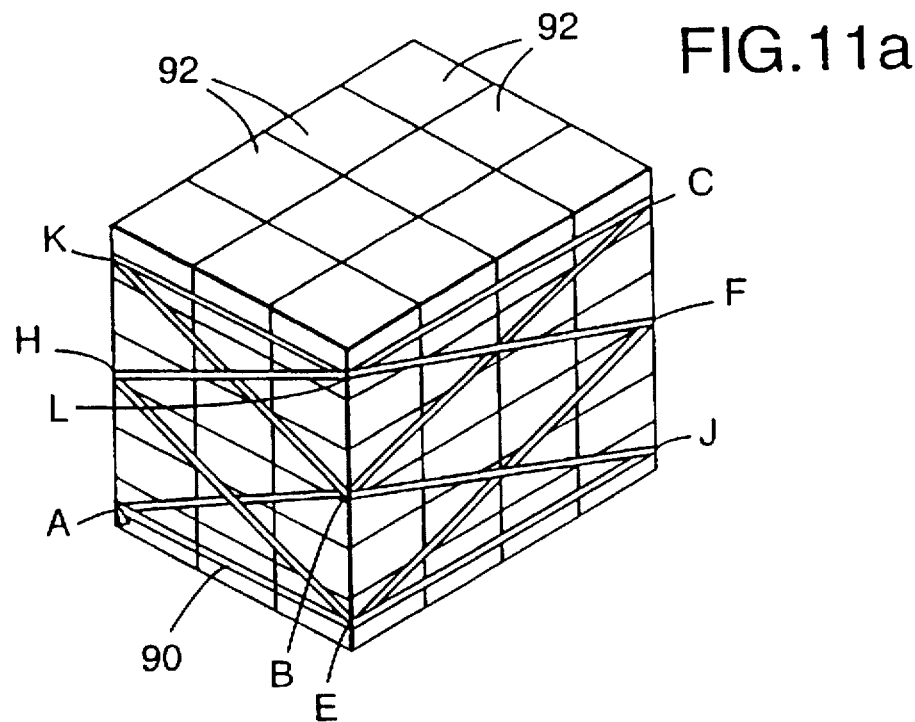
Figure 11B:
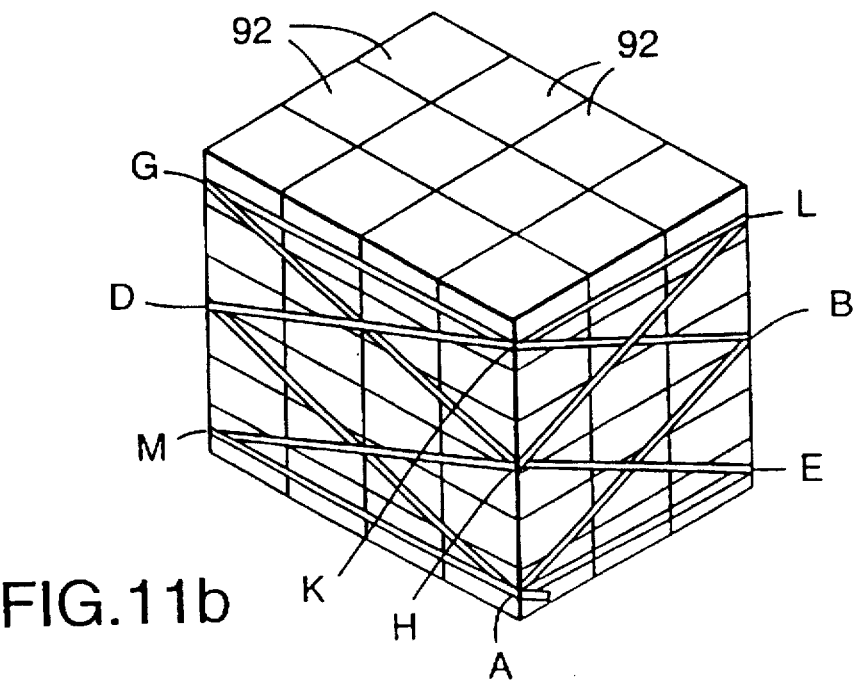

FIGS. 11a and 11b show a complex embodiment of the process according to the invention. Here, an extensible plastic tape 90 may be wound in a cross-like pattern around a group of articles, e.g., the boxes 92 arranged in a plurality of lines. The pattern ensures equal and counteracting forces stabilizing the articles and prevents them from being shifted when subjected to vibrational force. This pattern of packaging may be chosen for mechanically demanding fields of application, e.g., transport of articles by trucks over wide distances with relatively high speed.

Regarding the arrangement of articles as shown in FIGS. 11a and 11b, the extensible plastic tape 50 according to the invention may be affixed to a box 92 at point A. The free end of the extensible plastic tape should be stretched around a corner of box 92 so that subsequent stretching of the extensible plastic tape does not give rise to detachment of the plastic tape 90 from box 92, particularly, if the extensible plastic tape adheres to the box by virtue of a pressure sensitive adhesive. Then, tape 90 is stretched and, in the order indicated, is led around a second box at point B, then a third box 92 at point C, a fourth box at point D, the first box 92 at point A, a fifth box 92 at point E, a sixth box 92 at point F, a seventh box 92 at point G, an eighth box 92 at point H, the fifth box 92 at point E, a ninth box 92 at point J, the fourth box 92 at point D, a tenth box 92 at point K, an eleventh box 92 at point L, the third box 92 at point C, the eighth box 92 at point G, the tenth box 92 at point K, the second box 92 at point B, the ninth box 92 at point J, a twelfth box 91 at point M, the eighth box 92 at point H, the eleventh 92 at point L, the sixth box 92 at point F, the twelfth box 92 at point M, and the first box 92 at point A. Preferably, the extensible plastic tape is wound with tension around the articles situated on a pallet with the tape maintaining remainders any of its elastomeric properties. In a modified embodiment, the plastic tape according to the invention initially may be wound around a slat of the pallet and affixed to subsequently affix the articles in the above-described manner.

The extensible plastic tape of the invention with self-adhesive properties is illustrated in more detail by the following examples.

EXAMPLE 1
Fixing the Transfer Tape at the End of the Support Layer

A thin layer of pressure sensitive adhesive not arranged on a support (a transfer tape) and having a layer thickness of 50 µm of acrylic pressure sensitive adhesive is applied to an article to be bundled and/or fixated. One end of the extensible sheet forming the extensible support layer is adhered to the adhesive side of the transfer tape. As the support layer, an LLDPE sheet having a thickness of 100 µm and a density of 0.920 may be used. Then, the applied extensible support layer is stretched over a corner approximately in the plane of the adherent bond as described in U.S. patent application Ser. No. 07/731,341. Stretching and winding of tape is continued until the articles to be bundled and/or fixated are secured on a pallet. Then, another section of transfer tape is arranged on the support. The stretched film is connected to this section of tape followed by cutting the plastic tape.

EXAMPLE 2
Fixing the Extensible Plastic Tape with a Double-Side Adhesive Strip A double-side adhesive tape with a polyester sheet of 50 µm in thickness between the pressure sensitive adhesives is used. The pressure sensitive adhesive is a block copolymer-rubber resin pressure sensitive adhesive (3M Company). The double-side adhesive tape is applied to the article to be packaged as described in example 1. The double-side adhesive tape is arranged between the extensible plastic tape and the article to be fixated.

EXAMPLE 3
Fixing the Extensible Plastic Tare With a Single Side Adhesive Strip A commercially available adhesive tape for parcels (3M Company) having a thickness of 40 µm and comprising, a BOPP sheet and a block copolymer resin pressure sensitive adhesive is used to affix the ends of the stretched plastic tape. The one end of the extensible tape is held on the surface of the article to be packaged and secured by applying a section of parcel adhesive tape. The parcel adhesive tape is situated partly on the stretched tape and partly on the article to be packaged. If the stretched plastic tape is secured on the article in non-stretched state, it may be stretched subsequent to adherent fixing and led around the article to be fixated and bundled as described in the previous examples. Once the articles are wound round, the extensible tape is separated from the roll and the free end thus formed then is affixed to the article to be bundled and fixated by another section of parcel adhesive tape.

EXAMPLE 4
Fixing the Ends of the Extensible Tape With Hot Melt Adhesive

The hot melt adhesive is applied to the articles to be bundled and/or fixated by means of a hot melt adhesive gun in an amount leaving a spot of about 2 cm in diameter, with the extensible plastic tape covering the spot. As soon as the connection is sufficiently stable, the extensible tape is stretched and wound around the articles to be bundled and/or fixated. The stretched extensible plastic tape is fixed at a second position with hot melt adhesive followed by separating the roll behind the second point of adherent fixing.

EXAMPLE 5
Fixing the Plastic Tape With a Two-Component Adhesive

The extensible plastic tape is affixed to the articles to be bundled and/or fixated using a two-component adhesive. The two-component adhesive is applied to one of the articles to be bundled or fixated using an appropriate applicator. The extensible plastic tape is fixed as described in the preceding example.

EXAMPLE 6
Fixing the Extensible Tare With Clamps

One end of the extensible plastic tape is affixed to the pallet on which the articles to be fixated are arranged by using a stapler. Then, the extensible tape is stretched and laid around the articles to be fixated as described in the preceding examples, and then is clamped or stapled again at a second point. Thereafter, the tape is separated from the roll.

EXAMPLE 7

In order to effect bundling and/or fixing of articles without affixing the ends of the extensible tape to one of the articles, a certain length of extensible plastic tape is wound from the roll, led around the articles to be bundled or fixated with stretching, followed by connecting the loose ends using knots. Care should be taken that the terminal areas of the stretched tape each have a non-stretched area so that the knot formed cannot come loose by further stretching of the tape.

EXAMPLE 8

Initially, a certain length of extensible tape is laid around the articles to be bundled and/or fixated as described in example 7. The free ends are connected to each other using staples or clamps. Instead of using clamps, the free ends also may be sealed or glued together.

EXAMPLE 9

Initially, a certain length of extensible tape is wound around the articles to be bundled and/or fixated as described in the preceding examples. The free ends are put into provided gaps which form on bundling the articles, and are clamped or stapled.

EXAMPLE 10

One end of the extensible tape is tied with a knot around the edge of a slat of a package pallet. Thereafter, the tape is stretched and wound round the articles to be bundled and/or fixated. Similarly, the free end of the stretched tape may be affixed to a pallet slat by knotting tightly.

EXAMPLE 11

A tape made of LLDPE as described in example 1 is provided on one side with a usual layer of release agent from which the pressure sensitive adhesive can be removed easily. At the opposite side of this support layer, to receive the pressure sensitive adhesive, a corona treatment in ionizing atmosphere is carried out over the total area or in areas serving to receive pressure sensitive adhesive. Perpendicular to its longitudinal direction, the tape is cut into strips of 13 cm. The tape width is 2.5 cm. A square piece of 2.5 cm×2.5 cm of an adherent transfer tape is fixed onto the corona-treated surface of the support layer in the vicinity of each end of the strips.

Then, the strips with adhesive are arranged over one another so that in vertical direction, the adherent areas are arranged over one another, with the tacky areas of one strip adhering to the surface of the next strip, the surface of which being provided with pressure sensitive adhesive releasing properties.

I claim:

1. A process for bundling and/or fixing of articles using an extensible plastic tape with two ends having a Young modulus of at least approximately 170 bars but less than 7,000 bars and an extensibility in longitudinal direction of at least approximately 150%, with a recovery of less than 50 percent after extension, at least portions of the length of said plastic tape being free of pressure sensitive adhesive, wherein
   a. said plastic tape is permanently stretched, the permanently stretched tape is arranged around the articles to be bundled and/or fixated, and said ends of the tape are bound together;
   b. or said plastic tape is permanently stretched, one of said ends is then fixed, and thereafter said permanently stretched plastic tape is arranged around the articles to be bundled and/or fixated, and the other of said ends is fixed;
   c. and/or one of said ends of said plastic tape is fixed, said plastic tape is permanently stretched and arranged around the articles to be bundled and/or fixated, and the other of said ends is fixed.

2. The process according to claim 1, wherein stretching of the plastic tape is effected by applying force acting in longitudinal direction of the tape while arranging the plastic tape around the articles to be bundled and/or fixated.

3. The process according to claim 1, wherein affixing the plastic tape is effected by connecting one end of the tape to one of the articles to be fixated themselves, their wrapping, or support.

4. The process according to claim 3, wherein binding together the loose ends of the plastic tape is effected by knotting, cementing, clamping, clipping, sealing or combinations thereof.

5. The process according to claim 1, wherein the stretched plastic tape is arranged by winding around the articles to be bundled and/or fixated.

6. The process according to claim 1, wherein terminal areas of the plastic tape at said two ends are not stretched.

7. The process according to claim 1, wherein one of said ends is fixed on at least one article of the articles to be bundled and/or fixated by an adhesive spot, the extensible plastic tape, starting from the adhesive spot, is led around the articles to be bundled and/or fixated, followed by cementing the other end of the extensible plastic tape by an adhesive spot.

8. The process according to claim 7, wherein the adhesive spot by which at least one of said ends is fixed on at least one article of the articles to be bundled and/or fixated is on said one end of the extensible plastic tape.

9. The process according to claim 7, wherein each of the ends of the extensible plastic tape has one of said adhesive spots.

10. The process according to claim 7, wherein at least one of said adhesive spots is formed by hot melt adhesives, fast-setting adhesive such as two component adhesive, adhesive tapes such as single or double-side adhesive tapes, dry transferable adhesive films, or combinations thereof.

11. The process according to claim 7, wherein the extensible plastic tape either is arranged on the articles to be bundled and/or fixated, thereafter attached to at least one of said articles using a single side adhesive tape, or a transfer tape, or a double-side adhesive tape is attached to at least one of said articles as the fixation site, to which tape the extensible plastic tape is bound, then said tape is led around the articles to be bundled and/or fixated, starting from the fixation site, followed by affixing the other, still loose end of the extensible plastic tape.

12. The process according to claim 1, wherein the extensible plastic tape was part of a length of the tape wound on a roll, the length of plastic tape having been provided with an area of pressure sensitive adhesive, and the process includes cutting the plastic tape from the length of tape within the area of pressure sensitive adhesive so that the tape remaining on the roll is provided with pressure sensitive adhesive at the cut end, and the cut end of the plastic tape used for bundling and/or fixing of articles is provided with pressure sensitive adhesive.

13. The process according to claim 12, wherein the adhesive area is provided on the plastic tape just prior to using the plastic tape.

14. The process according to claim 12, wherein the length of plastic tape is transversely perforated at the area having pressure sensitive adhesive.

15. Extensible plastic tape (10) having self-adhesive properties and comprising a extensible support layer (1) having a Young modulus of at least approximately 170 bars but less than 7,000 bars and an extensibility in longitudinal direction of at least approximately 150%, with a recovery of less than 50 percent after extension, and having at least one area of pressure sensitive adhesive (2) on said support layer, said area of pressure sensitive adhesive not covering the entire length of the plastic tape.

16. Extensible plastic tape according to claim 15 having at least two areas of pressure sensitive adhesive (2), the areas with pressure sensitive adhesive (2) being separated by areas without pressure sensitive adhesive (3).

17. Extensible plastic tape according to claim 16, wherein the areas with pressure sensitive adhesive (2) are arranged at the ends of the plastic tape (10).

18. Extensible plastic tape according to claim 17, wherein the areas with pressure sensitive adhesive (2) are directly applied onto the extensible support layer (1).

19. Extensible plastic tape according to claim 17, wherein at least the area(s) (2) of support layer (1) onto which the pressure sensitive adhesive is applied have been treated physically, e.g., by corona treatment, or chemically.

20. Extensible plastic tape according to claim 15, wherein support layer (1) has a surface of low adhesiveness on the side opposite to the side with pressure sensitive adhesive.

21. Extensible plastic tape according to claim 19, wherein the areas with pressure sensitive adhesive (2) are formed by at least one double-side or transfer tape.

22. Extensible plastic tape according to claim 15, wherein the area with pressure sensitive adhesive (2) is covered with protective sheet (20).

23. Extensible plastic tape according to claim 22, wherein the protective sheet (20) covering the area with pressure sensitive adhesive at the same time is the extensible support layer (1') of an adjacent extensible plastic tape (10').

24. Extensible plastic tape according to claim 22, wherein the extensible support layer (1) has pressure sensitive adhesive releasing properties at the side opposite to the side having area(s) with pressure sensitive adhesive (2).

25. Extensible plastic tape according to claim 15, arranged in multilayered strip-shaped stacks (30), wherein several multilayered stacks also may be arranged beside one another.

26. Extensible plastic tape according to claim 25, wherein one end (40) of the strip-shaped extensible plastic tape (10) has an area with pressure sensitive adhesive (2), and the other end (45) of the strip-shaped extensible plastic tape (10) has a terminal area with pressure sensitive adhesive (2), and the latter area is at least partly covered with a protective sheet (20).

27. Extensible plastic tape according to claim 29, arranged in multilayered strip-shaped stacks, wherein several multilayered stacks also may be arranged beside one another, and the areas with pressure sensitive adhesive (2) not covered by a protective sheet (20) are arranged on the side of a further extensible plastic tape (10') of same or different design which side is opposite to the corresponding side of the further extensible plastic tape (10') having areas with pressure sensitive adhesive (2').

28. Extensible plastic tape according to claim 5, in a roll, wherein each adhesive area is formed larger than required for use in a process according to claim 14.

29. Extensible plastic tape according to claim 28, wherein, within the area of (2), the sensitive adhesive (2), the side of the extensible plastic tape opposite to this area is perforated within the area with pressure sensitive adhesive (2).

30. Extensible plastic tape according to claim 15, wherein the extensible support layer (1) consists of polyethylene having a density of from 0.80 to 0.95 g/cm$^3$.

31. Extensible plastic tape according to claim 12 having a recovery of less than 30 percent after extension.

32. Extensible plastic tape according to claim 12 having a recovery of less than 20 percent after extension.

* * * * *